D. P. GILSTRAP.
FISH NET.
APPLICATION FILED OCT. 4, 1909.
957,766.
Patented May 10, 1910.
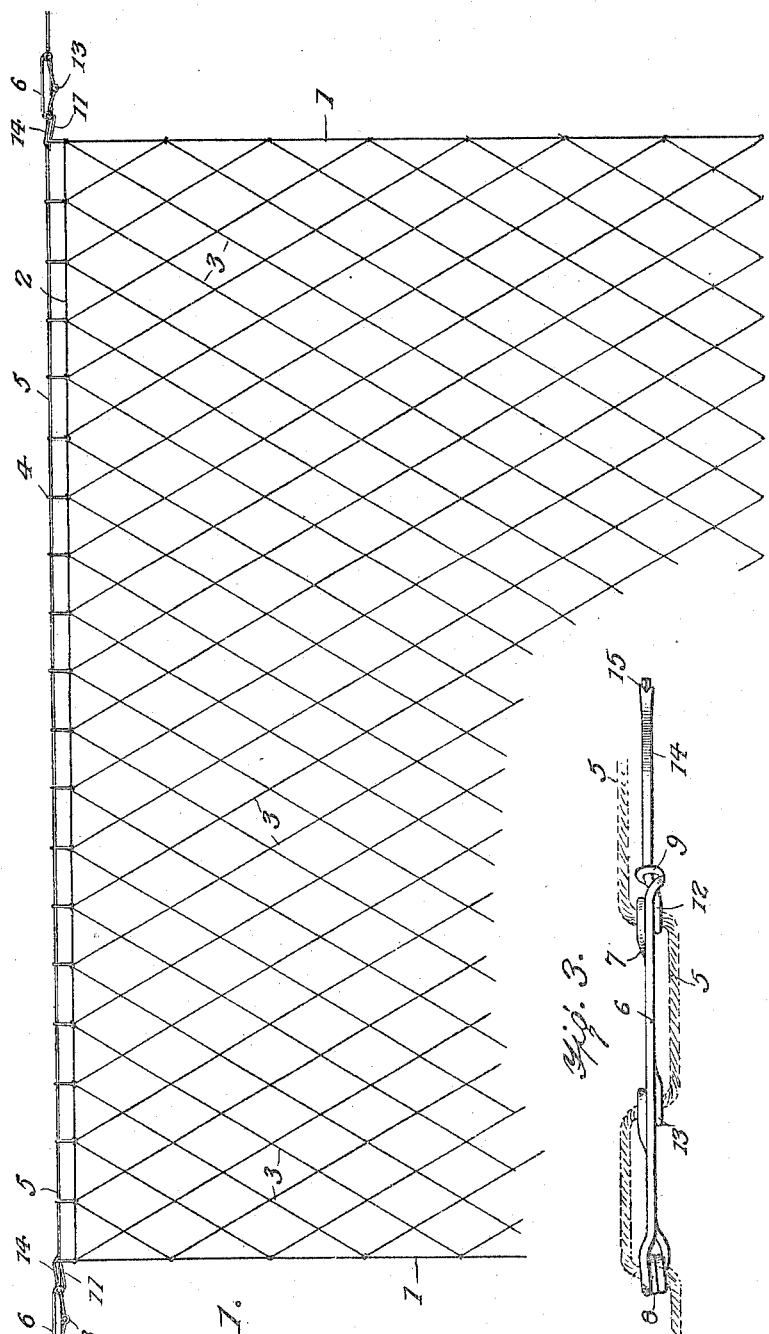
INVENTOR
DAVID P. GILSTRAP,
BY Munn & Co.
ATTORNEYS

UNITED STATES PATENT OFFICE.

DAVID P. GILSTRAP, OF BROWNWOOD, TEXAS.

FISH-NET.

957,766.

Specification of Letters Patent.　Patented May 10, 1910.

Application filed October 4, 1909.　Serial No. 520,793.

*To all whom it may concern:*

Be it known that I, DAVID P. GILSTRAP, a citizen of the United States, and a resident of Brownwood, in the county of Brown, State of Texas, have invented certain new and useful Improvements in Fish-Nets, of which the following is a specification.

My invention is an improvement in fish nets, and consists in certain novel constructions and combinations of parts hereinafter described and claimed.

The object of the invention is to provide a woven net formed of intermeshed cords without floats, sinkers, drawstrings and the like encumbering attachments, and which will run freely upon a single supporting cord.

A further object is to provide an improved spring trip for the cord.

Referring to the drawings forming a part hereof: Figure 1 is a front view of a portion of a net constructed in accordance with the improvements; Fig. 2 is an enlarged detail front view of a portion of the net, showing the trip; and Fig. 3 is a plan view of the same.

The present embodiment of the invention comprises a net consisting of side cords 1, end cords 2, and interwoven inner cords 3, the cords being woven together in any suitable or desired manner and with a mesh to meet the conditions under which it is to be used. At spaced intervals on the end cord 2, and preferably at the connection of the meshes therewith, are secured in any suitable manner a plurality of open rings 4, and a supporting cord 5 is passed through the rings. A spring trip is secured to each end of the cord 5 and the end rings of the net are connected with the trips. Each trip is formed of a single piece of wire, and they are precisely the same in construction, so that only one will be described. Each trip consists of two substantially parallel portions 6 and 7, and a coil 8 is interposed between the portions at one end. Adjacent to the other end the portion 6 is bent to encircle the portion 7 twice, as indicated at 9, and is then bent downwardly and backwardly, as at 10, and forwardly, as at 11. The portion 7 is provided with a coil 12 adjacent to the portion 9, and a coil 13 is also interposed in its length intermediate the coils 8 and 12. Beyond the coil 12 the said portion 7 extends substantially parallel with the portion 11, as at 14, and the free end thereof is forked, as at 15, and engages the portion 11, as shown in Figs. 2 and 3. The cord 5 passes through the coils 8, 12 and 13, as shown in Fig. 3 more especially, and supports the trip. The trip is slidable on the cord, but with so much friction that it is practically fixed. The end rings 4 of the net are, as before stated, engaged by the trips, the ring resting on the portion 11 and being prevented from disengagement by the engagement of the fork 15 with the end of the portion 11.

It will be observed that the peculiar construction of the trip provides a spring catch which is frictionally engaged with the supporting cord in such manner that it may be adjusted thereon, while the catch permits the rings 4 to be dislodged when strain is brought to bear on the net.

In use, the cord is fixed in a suitable place and in such manner that the net depends into the water. The trips are adjusted to proper position on the cord, and the rings 4 are engaged therewith. The trips are separated sufficiently from each other to hold the net properly stretched.

When fish strike the net with sufficient force, one or both of the rings will be disengaged, permitting the net to fold upon the fish, thus securely entangling them in its folds. The net is now free to slide on the cord, but is still firmly supported thereby.

It will be evident that the improved net might be used with equal facility for trapping animals of any kind, since it acts as a trap as well as a net.

I claim:

1. The combination with a net, of a plurality of rings secured to one side of the net in spaced relation, a cord for supporting the net passing loosely through the rings, and a spring trip at each end of the net and adjustable on the cord, each of said trips comprising a strand bent upon itself to form a pair of substantially parallel portions, having a coil interposed between said portions at one end through which the cord passes, one of said portions intermediate its ends being bent to encircle the other, the other portion being provided with a plurality of coils through which the cord passes, and having at its free end a fork extending substantially parallel with the other portion and engaging the end thereof loosely, the said ends forming a catch for detachably holding a ring, for the purpose specified.

2. The combination with a net, of a plurality of rings secured to one side of the net in spaced relation, a cord for supporting the net passing loosely through the rings, and a spring trip at each end of the net, and adjustable on the cord, each of said trips comprising a strand bent upon itself to form substantially parallel portions connected at one end and intermediate their ends, and contacting at their free ends to engage and yieldingly hold a ring, one of said portions having means for frictionally engaging the cord, for the purpose specified.

3. The combination with a net, of a plurality of rings secured to one side of the net in spaced relation, a cord for supporting the net passing loosely through the rings, and a spring trip at each end of the net, and adjustable on the cord, each of said trips comprising a strand bent upon itself to form substantially parallel portions connected at one end and intermediate their ends and forming at their free ends a catch for the purpose specified, one of said portions having means for frictionally engaging the cord.

4. The combination with a net, of a plurality of rings secured to one side of the net in spaced relation, a cord for supporting the net passing loosely through the rings, and a spring trip at each end of the net, and adjustable on the cord, each of said trips comprising a portion for frictionally engaging the cord, and a resilient catch for releasably holding a ring.

5. The combination with a net, of a plurality of rings secured to one side of the net in spaced relation, a cord for supporting the net passing loosely through the rings, and a spring trip at each end of the net, and adjustable on the cord, each of said trips engaging the cord and adjustable thereon, and having a spring catch for engaging a ring.

6. The combination with a net, of a plurality of rings secured to one side of the net in spaced relation, a cord for supporting the net passing loosely through the rings, and a spring trip at each end of the net, and adjustable on the cord and detachably engaging a ring of the net, for the purpose specified.

7. In combination, a net provided on one side with spaced rings, a cord passing through the rings for supporting the net, and a catch adjustable on the cord at each end of the net for releasably holding a ring.

8. In combination, a supporting cord, a net slidably connected therewith, and a trip engaging each end of the net and adjustable on the cord, and means in connection with the trip for releasing the net when strain is brought to bear thereon.

DAVID P. GILSTRAP.

Witnesses:
T. M. McHoose,
Young Hester.